(12) United States Patent
Jung et al.

(10) Patent No.: US 7,193,680 B2
(45) Date of Patent: Mar. 20, 2007

(54) METHOD FOR FORMING SEAL PATTERN OF LIQUID CRYSTAL DISPLAY DEVICE

(75) Inventors: Sung Su Jung, Taegu-kwangyokshi (KR); Soo Min Kwak, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 35 days.

(21) Appl. No.: 10/607,046

(22) Filed: Jun. 27, 2003

(65) Prior Publication Data

US 2005/0174523 A1    Aug. 11, 2005

(30) Foreign Application Priority Data

Nov. 28, 2002    (KR) .................. 10-2002-0074818

(51) Int. Cl.
*G02F 1/1339*    (2006.01)
(52) U.S. Cl. ................... 349/190; 349/153; 349/187
(58) Field of Classification Search .............. 349/73, 349/153, 187, 190
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,276,541 A * | 1/1994 | Terada et al. ............... 349/190 |
| 5,379,139 A | 1/1995 | Sato et al. |
| 5,406,989 A | 4/1995 | Abe |
| 5,499,127 A | 3/1996 | Tsubota et al. |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,771,085 A | 6/1998 | Ochi et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,952,678 A | 9/1999 | Ashida |
| 5,956,112 A | 9/1999 | Fujimori et al. |
| 6,001,203 A | 12/1999 | Yamada et al. |

(Continued)

FOREIGN PATENT DOCUMENTS

| | | |
|---|---|---|
| EP | 1 003 066 A1 | 5/2000 |
| EP | 1 003 066 A1 A1 | 5/2000 |
| JP | 51-65656 | 6/1976 |

(Continued)

*Primary Examiner*—Andrew Schechter
*Assistant Examiner*—Michael H. Caley
(74) *Attorney, Agent, or Firm*—McKenna Long & Aldridge LLP

(57) ABSTRACT

A method for forming a seal pattern of an LCD device includes a division mask to print seal patterns onto a substrate. A substrate having a plurality of liquid crystal display panels is prepared; a mask having an opening is arranged on at least one liquid crystal display panel; a seal pattern is formed on the liquid crystal display panel corresponding to the opening with the mask; and the mask is re-arranged on another liquid crystal display panel to form a seal pattern on a corresponding liquid crystal display panel.

58 Claims, 10 Drawing Sheets

U.S. PATENT DOCUMENTS

| | | | |
|---|---|---|---|
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,222,603 B1 | 4/2001 | Sakai et al. | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,549,259 B2 * | 4/2003 | Sato et al. | 349/153 |
| 6,740,190 B2 | 5/2004 | Takase | |
| 2001/0021000 A1 | 9/2001 | Egami | |
| 2001/0040667 A1 | 11/2001 | Sasaki | |
| 2003/0231277 A1 * | 12/2003 | Zhang | 349/187 |

FOREIGN PATENT DOCUMENTS

| | | |
|---|---|---|
| JP | 51-065656 | 6/1976 |
| JP | 57-038414 | 3/1982 |
| JP | 57-038414 A1 | 3/1982 |
| JP | 57-088428 | 6/1982 |
| JP | 57-088428 A1 | 6/1982 |
| JP | 58-027126 | 2/1983 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-164723 A1 | 8/1985 |
| JP | 60-217343 | 10/1985 |
| JP | 60-217343 A1 | 10/1985 |
| JP | 61-007822 | 1/1986 |
| JP | 61-007822 A1 | 1/1986 |
| JP | 61-055625 | 3/1986 |
| JP | 61-055625 A1 | 3/1986 |
| JP | S62-054225 | 3/1987 |
| JP | S62-054228 | 3/1987 |
| JP | S62-054229 | 3/1987 |
| JP | 60-090622 | 4/1987 |
| JP | 62-089025 | 4/1987 |
| JP | 62-089025 A1 | 4/1987 |
| JP | 62-090622 A1 | 4/1987 |
| JP | 62-205319 | 9/1987 |
| JP | 62-205319 A1 | 9/1987 |
| JP | 63-109413 | 5/1988 |
| JP | 63-109413 A1 | 5/1988 |
| JP | 63-110425 | 5/1988 |
| JP | 63-110425 A1 | 5/1988 |
| JP | 63-128315 | 5/1988 |
| JP | 63-128315 A1 | 5/1988 |
| JP | 63-311233 | 12/1988 |
| JP | 63-311233 A1 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-127179 A1 | 5/1993 |
| JP | 05-154923 | 6/1993 |
| JP | 05-265011 | 10/1993 |
| JP | 05-265011 A1 | 10/1993 |
| JP | 05-281557 | 10/1993 |
| JP | 05-281557 A1 | 10/1993 |
| JP | 05-281562 | 10/1993 |
| JP | 05-281562 A1 | 10/1993 |
| JP | H06-018829 | 1/1994 |
| JP | 06-051256 | 2/1994 |
| JP | 06-051256 A1 | 2/1994 |
| JP | H06-064229 | 3/1994 |
| JP | 06-148657 | 5/1994 |
| JP | 06-148657 A1 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-265915 A1 | 9/1994 |
| JP | 06-313870 | 11/1994 |
| JP | 07-084268 | 3/1995 |
| JP | 07-128674 | 5/1995 |
| JP | 07-128674 A1 | 5/1995 |
| JP | 07-084268 | 6/1995 |
| JP | 07-181507 | 7/1995 |
| JP | 07-181507 A1 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-095066 A1 | 4/1996 |
| JP | 08-101395 | 4/1996 |
| JP | 08-106101 | 4/1996 |
| JP | 08-106101 A1 | 4/1996 |
| JP | H08-110504 | 4/1996 |
| JP | H08-136937 | 5/1996 |
| JP | 08-171094 | 7/1996 |
| JP | 08-171094 A1 | 7/1996 |
| JP | 08-190099 | 7/1996 |
| JP | 08-190099 A1 | 7/1996 |
| JP | H08-173874 | 7/1996 |
| JP | 08-240807 | 9/1996 |
| JP | 08-240807 A1 | 9/1996 |
| JP | 09-005762 | 1/1997 |
| JP | 09-005762 A1 | 1/1997 |
| JP | 09-026578 | 1/1997 |
| JP | 09-026578 A1 | 1/1997 |
| JP | H09-001026 | 1/1997 |
| JP | 09-311340 | 2/1997 |
| JP | 09-061829 | 3/1997 |
| JP | 09-61829 | 3/1997 |
| JP | 09-073075 | 3/1997 |
| JP | 09-073075 A1 | 3/1997 |
| JP | 09-073096 | 3/1997 |
| JP | 09-073096 A1 | 3/1997 |
| JP | H09-094500 | 4/1997 |
| JP | 09-127528 | 5/1997 |
| JP | 09-127528 A1 | 5/1997 |
| JP | 09-230357 | 9/1997 |
| JP | 09-230357 A1 | 9/1997 |
| JP | 09-281511 | 10/1997 |
| JP | 09-281511 A1 | 10/1997 |
| JP | 09-311340 A1 | 12/1997 |
| JP | 10-123537 | 5/1998 |
| JP | 10-123537 A1 | 5/1998 |
| JP | 10-123538 | 5/1998 |
| JP | 10-123538 A1 | 5/1998 |
| JP | 10-142616 | 5/1998 |
| JP | 10-142616 A1 | 5/1998 |
| JP | 10-177178 | 6/1998 |
| JP | H10-174924 | 6/1998 |
| JP | 10-221700 | 8/1998 |
| JP | 10-221700 A1 | 8/1998 |
| JP | 10-282512 | 10/1998 |
| JP | 10-282512 A1 | 10/1998 |
| JP | 10-333157 | 12/1998 |
| JP | 10-333159 | 12/1998 |
| JP | 11-014953 | 1/1999 |
| JP | 11-014953 A1 | 1/1999 |
| JP | 11-038424 | 2/1999 |
| JP | 11-038424 A1 | 2/1999 |
| JP | 11-064811 | 3/1999 |
| JP | 11-064811 A1 | 3/1999 |

| | | | | | | |
|---|---|---|---|---|---|---|
| JP | 11-109388 | 4/1999 | | JP | 2001-330837 | 11/2001 |
| JP | 11-109388 A1 | 4/1999 | | JP | 2001-330840 | 11/2001 |
| JP | 11-133438 | 5/1999 | | JP | 2001-330840 A1 | 11/2001 |
| JP | 11-142864 | 5/1999 | | JP | 2001-356353 | 12/2001 |
| JP | 11-333438 | 5/1999 | | JP | 2001-356354 | 12/2001 |
| JP | 11-174477 | 7/1999 | | JP | 2001-356354 A1 | 12/2001 |
| JP | 11-174477 A1 | 7/1999 | | JP | 2002-014360 | 1/2002 |
| JP | 11-212045 | 8/1999 | | JP | 2002-014360 A1 | 1/2002 |
| JP | 11-212045 A1 | 8/1999 | | JP | 2002-023176 | 1/2002 |
| JP | 11-248930 | 9/1999 | | JP | 2002-023176 A1 | 1/2002 |
| JP | H11-262712 | 9/1999 | | JP | 2002-049045 | 2/2002 |
| JP | H11-264991 | 9/1999 | | JP | 2002-049045 A1 | 2/2002 |
| JP | 11-326922 | 11/1999 | | JP | 2002-079160 | 3/2002 |
| JP | 11-344714 | 12/1999 | | JP | 2002-080321 | 3/2002 |
| JP | 11-344714 A1 | 12/1999 | | JP | 2002-082340 | 3/2002 |
| JP | 2000-002879 | 1/2000 | | JP | 2002-082340 A1 | 3/2002 |
| JP | 2000-029035 | 1/2000 | | JP | 2002-090759 | 3/2002 |
| JP | 2000-056311 | 2/2000 | | JP | 2002-090759 A1 | 3/2002 |
| JP | 2000-066163 | 3/2000 | | JP | 2002-090760 | 3/2002 |
| JP | 2000-066165 | 3/2000 | | JP | 2002-090760 A1 | 3/2002 |
| JP | 2000-066218 | 3/2000 | | JP | 2002-107740 | 4/2002 |
| JP | 2000-093866 | 4/2000 | | JP | 2002-107740 A1 | 4/2002 |
| JP | 2000-137235 | 5/2000 | | JP | 2002-122870 | 4/2002 |
| JP | 2000-147528 | 5/2000 | | JP | 2002-122872 | 4/2002 |
| JP | 2000-193988 | 7/2000 | | JP | 2002-122872 A1 | 4/2002 |
| JP | 2000-241824 | 9/2000 | | JP | 2002-122873 | 4/2002 |
| JP | 2000-284295 | 10/2000 | | JP | 2002-122873 A1 | 4/2002 |
| JP | 2000-292799 | 10/2000 | | JP | 2002-131762 | 5/2002 |
| JP | 2000-310759 | 11/2000 | | JP | 2002-139734 | 5/2002 |
| JP | 2000-310784 | 11/2000 | | JP | 2002-156518 | 5/2002 |
| JP | 2000-338501 | 12/2000 | | JP | 2002-169166 | 6/2002 |
| JP | 2001-005401 | 1/2001 | | JP | 2002-169167 | 6/2002 |
| JP | 2001-005405 | 1/2001 | | JP | 2002-182222 | 6/2002 |
| JP | 2001-013506 | 1/2001 | | JP | 2002-202512 | 7/2002 |
| JP | 2001-033793 | 2/2001 | | JP | 2002-202512 A1 | 7/2002 |
| JP | 2001-042341 | 2/2001 | | JP | 2002-202514 | 7/2002 |
| JP | 2001-051284 | 2/2001 | | JP | 2002-202514 A1 | 7/2002 |
| JP | 2001-066615 | 3/2001 | | JP | 2002-214626 | 7/2002 |
| JP | 2001-091727 | 4/2001 | | JP | 2002-214626 A1 | 7/2002 |
| JP | 2001-117105 | 4/2001 | | JP | 2002-229042 | 8/2002 |
| JP | 2001-117109 | 4/2001 | | JP | 2002-236276 | 8/2002 |
| JP | 2001-133745 | 5/2001 | | JP | 2002-258299 | 8/2002 |
| JP | 2001-133794 | 5/2001 | | JP | 2002-236292 | 9/2002 |
| JP | 2001-133799 | 5/2001 | | JP | 2002-277865 | 9/2002 |
| JP | 2001-142074 | 5/2001 | | JP | 2002-277866 | 9/2002 |
| JP | 2001-147437 | 5/2001 | | JP | 2002-277881 | 9/2002 |
| JP | 2001-154211 | 6/2001 | | JP | 2002-287156 | 10/2002 |
| JP | 2001-166272 | 6/2001 | | JP | 2002-296605 | 10/2002 |
| JP | 2001-166310 | 6/2001 | | JP | 2002-311438 | 10/2002 |
| JP | 2001-183683 | 7/2001 | | JP | 2002-311440 | 10/2002 |
| JP | 2001-201750 | 7/2001 | | JP | 2002-311442 | 10/2002 |
| JP | 2001-209052 | 8/2001 | | JP | 2002-323687 | 11/2002 |
| JP | 2001-209056 | 8/2001 | | JP | 2002-323694 | 11/2002 |
| JP | 2001-209057 | 8/2001 | | JP | 2002-333628 | 11/2002 |
| JP | 2001-209058 | 8/2001 | | JP | 2002-333635 | 11/2002 |
| JP | 2001-209060 | 8/2001 | | JP | 2002-333843 | 11/2002 |
| JP | 2001-215459 | 8/2001 | | JP | 2002-341329 | 11/2002 |
| JP | 2001-222017 | 8/2001 | | JP | 2002-341355 | 11/2002 |
| JP | 2001-235758 | 8/2001 | | JP | 2002-341356 | 11/2002 |
| JP | 2001-215459 | 9/2001 | | JP | 2002-341357 | 11/2002 |
| JP | 2001-255542 | 9/2001 | | JP | 2002-341358 | 11/2002 |
| JP | 2001-264782 | 9/2001 | | JP | 2002-341359 | 11/2002 |
| JP | 2001-201750 | 10/2001 | | JP | 2002-341362 | 11/2002 |
| JP | 2001-272640 | 10/2001 | | KR | 2000-0035302 | 6/2000 |
| JP | 2001-281675 | 10/2001 | | KR | 2000-035302 A1 | 6/2000 |
| JP | 2001-281678 | 10/2001 | | | | |
| JP | 2001-282126 | 10/2001 | | | | |
| JP | 2001-305563 | 10/2001 | | * cited by examiner | | |

METHOD FOR FORMING SEAL PATTERN OF LIQUID CRYSTAL DISPLAY DEVICE

This application claims the benefit of the Korean Application No. P2002-74818 filed on Nov. 28, 2002, which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD) device, and more particularly, to a method for forming seal patterns in an LCD device while improving a device yield.

2. Discussion of the Related Art

With the expansion of the information society, a need has arisen for displays capable of producing high quality images in thin, lightweight packages and that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in information displays.

Of the various types of flat panel display devices, LCD are very widely used. In fact, in portable devices, such as notebook PC computers, LCD technology has already replaced cathode ray tubes (CRT) as the display of choice. Moreover, even in desktop PCs and TV monitors, LCDs devices are becoming more common.

Despite various technical developments in LCD technology, however, research in enhancing picture quality of LCD devices has been lacking compared to research in other features and advantages of LCD devices. Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

LCDs generally include an LCD panel for displaying an image and a driving part for providing driving signals to the liquid crystal display panel.

Typically, LCD panels include first and second glass substrates bonded to each other while being spaced apart by a cell gap, wherein a layer of liquid crystal material is injected into the cell gap.

The first glass substrate (i.e., thin film transistor (TFT) array substrate), supports a plurality of gate lines spaced apart from each other at a fixed interval and extending along a first direction; a plurality of data lines spaced apart from each other at a fixed interval and extending along a second direction, substantially perpendicular to the first direction, wherein pixel regions are defined by crossings of the gate and data lines; a plurality of pixel electrodes arranged in a matrix pattern within respective ones of the pixel regions; and a plurality of thin film transistors (TFTs) capable of transmitting signal from the data lines to corresponding ones of the pixel electrodes in response to a signal applied to respective ones of the gate lines.

The second glass substrate (i.e., color filter substrate) supports a black matrix layer for preventing light leakage in areas outside the pixel regions; a color filter layer (R, G, B) for selectively transmitting light having predetermined wavelengths; and a common electrode for displaying a picture. Common electrodes of In-Plane Switching (IPS) mode LCD devices, however, are formed on the first substrate.

Uniformity of the cell gap is maintained by spacers arranged between the first and second glass substrates, which are bonded together by a seal pattern. The seal pattern includes a liquid crystal injection inlet allowing liquid crystal material to be injected into the cell gap. Upon injecting liquid crystal material into the cell gap via the liquid crystal injection inlet, the layer of liquid crystal material is thus formed.

The layer of liquid crystal material is driven (e.g., light transmittance characteristics of the layer of liquid crystal material are controlled) according to electric fields generated between the first and second substrates by the pixel electrode and the common electrode. By controlling the light transmittance characteristics of the layer of liquid crystal material, pictures may be displayed.

To form the aforementioned layer of liquid crystal material, related art manufacturing methods incorporate a liquid crystal injection method wherein a pressure difference is created between the cell gap and a vacuum chamber and liquid crystal material is injected into the liquid crystal injection inlet via a capillary phenomenon. A method for manufacturing the related art LCD device incorporating the liquid crystal injection method will now be described.

The first substrate (i.e., a TFT array substrate), supporting the TFTs and pixel electrodes, and the second substrate (i.e., the color filter substrate), supporting the black matrix layer, color filter layer, and common electrode, are provided. Next, spacers are dispersed on the TFT array substrate to maintain a uniform cell gap between the two substrates. A seal pattern is then formed at a periphery of the other of the two substrates to prevent liquid crystal material from leaking and to bond the two substrates together. The seal pattern is typically formed of a thermo-hardening material such as an epoxy including a mixture of an epoxy resin and an initiator. Next, a heat treatment is performed to bond the TFT array and color filter substrates to each other. When performing the heat treatment, the epoxy resin within the epoxy seal pattern is activated by the initiator and becomes a highly cross-linked polymer. As a result, the epoxy seal pattern functions as the seal pattern having suitable adhesion characteristics.

Subsequently, the bonded substrates are placed in a vacuum chamber, wherein the cell gap between the bonded substrates is maintained in a vacuum state, and dipped into a reservoir of liquid crystal material. Since a vacuum is maintained within the cell gap, liquid crystal material is injected into the cell gap by a capillary phenomenon. After a predetermined amount of liquid crystal material has been injected into the cell gap, nitrogen gas ($N_2$) is pumped into the vacuum chamber, so that liquid crystal material is injected into regions of the cell gap not previously injected into, according to the pressure difference between the cell gap and the pressure within the vacuum chamber having the pumped nitrogen gas ($N_2$). As a result, the layer of liquid crystal material is formed between the bonded TFT array and color filter substrates.

FIG. 1 illustrates a plan view illustrating a related art LCD device.

Referring to FIG. 1, the first substrate (i.e., the TFT array substrate) supports a plurality of gate lines 11 spaced apart from each other at a fixed interval and extending along a first direction and a plurality of data lines 12 spaced apart from each other at a fixed interval and extending along a second direction, substantially perpendicular to the first direction. Pixel regions P are defined by crossings of the gate and data lines 11 and 12, respectively. A plurality of pixel electrodes 16 are arranged in a matrix pattern within respective ones of the pixel regions P, and thin film transistors are formed at crossings of the plurality of gate and data lines 11 and 12, respectively. In response to signals applied from the gate lines 11, the thin film transistors transmit signals applied from the data lines 12 to respective ones of the pixel electrodes 16.

Each the thin film transistor includes a gate electrode 13 protruding from a corresponding gate line 11, a gate insulating layer (not shown) formed over an entire surface of the first substrate 10, a semiconductor layer 15 formed on the gate insulating layer in a region above the gate electrode 13, a source electrode 15a protruding from a corresponding data line 12, and a drain electrode 15b formed opposite the source electrode 15a by a predetermined distance and electrically connected to the pixel electrode 16 through a contact hole 17.

The second substrate (i.e., the color filter substrate; not shown) supports a black matrix layer having openings in regions corresponding to the pixel regions P of the first substrate 10 and prevents light leakage; an R/G/B color filter layer for selectively transmitting light having predetermined wavelengths; and a common electrode for driving the layer of liquid crystal material with the pixel electrodes 16.

The first substrate 10 is bonded to the second substrate (i.e., the color filter substrate), wherein the two substrates are spaced apart from each other by a predetermined distance, uniformly maintained by spacers. The first and second substrates are bonded to each other using a seal pattern having a liquid crystal injection inlet. Upon injecting liquid crystal material into the cell gap via the liquid crystal injection inlet, the layer of liquid crystal material is thus formed.

FIG. 2A illustrates a method of forming a seal pattern according to a screen printing method.

Referring to FIG. 2A, a screen printing apparatus includes a one piece screen mask 32 having an opening 31 for selectively exposing a seal pattern region and a squeegee 33 for forming the seal pattern on the first substrate 10 by selectively providing sealant material to the first substrate 10 via the screen mask 32. After arranging the one piece screen mask 32 on the first substrate 10, sealant material is disposed and the seal pattern is formed on the first substrate 10 in regions corresponding to the opening 31 by rolling a squeegee 33 over the first substrate 10 along the arrow direction in the drawing. Next, solvent within the seal pattern is evaporated in a drying process for leveling. Further, the seal pattern includes a liquid crystal injection inlet at one side thereof and is arranged at a periphery of a picture display region to prevent liquid crystal from leaking.

The aforementioned related art screen printing method is a relatively simple process to perform. However, use of the aforementioned related art screen printing method is problematic because the amount of sealant material used can be excessive. More specifically, while sealant material is disposed over the entire surface of the screen mask 32, only a small portion of the disposed sealant material is actually incorporated into the seal pattern by the squeegee 33. Further, the screen mask 32 contacts the first substrate 10. Such contact generates defects within an alignment layer (not shown) formed on the first substrate 10 because the screen mask 32 damages the alignment layer. Accordingly, a picture quality of the related art LCD device becomes deteriorated.

Further, when seal patterns are formed according to the aforementioned related art screen printing method, the size of a one piece screen mask is often limited to a predetermined, maximum size. Therefore, it becomes difficult to effectively use remaining portions of large-sized base substrates (i.e., portions of substrate within which LCD panels are not formed), and the cost of manufacturing LCD panels grows excessively. Further, the size of the related art one piece screen mask must be increased in accordance with the size of the LCD panel. As the size of LCD panels increases, the size of the related art one piece screen masks also increase, thereby making the related art one piece screen mask difficult to maintain and handle.

In order to solve the problems arising from use of the aforementioned related art screen printing method, a seal dispensing method has been proposed.

FIG. 2B illustrates a method of forming a seal pattern according to a dispensing method.

Referring to FIG. 2B, the first substrate 10 (i.e., the TFT array substrate) is loaded onto a stage (not shown) capable of moving in many directions. Next, sealant material 7 is selectively dispensed along the periphery of the first substrate 10 via a syringe apparatus 34. Though not shown in FIG. 2B (or 2A), the seal pattern 7 typically includes a main seal pattern and a dummy seal pattern wherein the dummy seal pattern is formed to protect the main seal pattern and to prevent liquid crystal material from leaking. Upon selectively dispensing sealant material along the periphery of the first substrate 10, a seal pattern is formed along the periphery of the first substrate 10. Using the aforementioned related art dispensing method, the amount of sealant material used may be decreased compared to the aforementioned related art screen printing method since sealant material is selectively dispensed along the periphery of the first substrate 10. Further, the syringe apparatus 34 does not contact the first substrate 10 such that damage to the alignment layer is substantially avoided and the picture quality of the LCD device is improved.

Use of the aforementioned related art dispensing method of forming the seal pattern becomes problematic, however, when the size of the first substrate increases, or when a size of a picture display area of the LCD panel changes (e.g., upon a model change of the liquid crystal display panel). In light of recent demand for liquid crystal display panels having increased size, the size of the first substrate has also increased. Accordingly, positions where seal patterns are formed on the substrate must change. In the aforementioned related art dispensing method, if the positions where the seal pattern is formed on the substrate changes, the syringe apparatus must be disassembled and reassembled. As the size of liquid crystal display panels increase, the amount of time required to dispense a seal pattern having an increased size also increases. Accordingly, the tact time increases and the device yield of the dispensing method decreases.

SUMMARY OF THE INVENTION

Accordingly, the present invention is directed to a method of forming a seal pattern for an LCD device that substantially obviates one or more problems due to limitations and disadvantages of the related art.

An advantage of the present invention provides a method of forming a seal pattern for an LCD device, wherein a division mask may be used to improve the efficiency with which the seal pattern is formed, thereby decreasing manufacturing time and improving efficiency with which LCD panels are formed within large-sized base substrates.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a method of forming a seal pattern for a liquid crystal display device may, for example, include preparing a base substrate within which a plurality of liquid crystal display panels may be disposed; arranging a mask having an opening over a portion of the base substrate in a region corresponding to at least one liquid crystal display panel; forming a seal pattern corresponding to the liquid crystal display panel via the opening within the mask; and re-arranging the mask over another portion of the base substrate in a region corresponding to another liquid crystal display panel; and forming a seal pattern corresponding to the another liquid crystal display panel.

In another aspect of the present invention, a method of forming a seal pattern for a liquid crystal display device may, for example, include preparing a base substrate within which a first liquid crystal display panel having a first size and at least one second liquid crystal display panel having a second size, different from the first size, may be disposed; arranging a first mask having an opening over a portion of the base substrate corresponding to the first liquid crystal display panel; forming a first seal pattern corresponding to the first liquid crystal display panel via the opening within the first mask; arranging a second mask having an opening over a portion of the base substrate corresponding to the second liquid crystal display panel; and forming a second seal pattern corresponding to the second LCD panel via the opening within the second mask.

In still another aspect of the present invention, a method of forming a seal pattern for a liquid crystal display device may, for example, include preparing a base substrate having first and second regions, wherein the first and second regions include a plurality of first liquid crystal display panels having a first size and a plurality of second liquid crystal display panels having a second size, different from the first size, respectively; arranging a first mask having openings over the first region of the base substrate including the plurality of first liquid crystal display panels; forming a plurality of first seal patterns corresponding to the plurality of liquid crystal display panels within the first region via the openings within the first mask; arranging a second mask having openings over the second region of the base substrate including the plurality of second liquid crystal display panels; and forming a plurality of second seal patterns corresponding to the plurality of second liquid crystal display panels within the second region via the openings within the second mask.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

FIGS. 3A to 3E illustrate a method of forming a seal pattern for an LCD device in accordance with a first aspect of the present invention.

Figure 1:
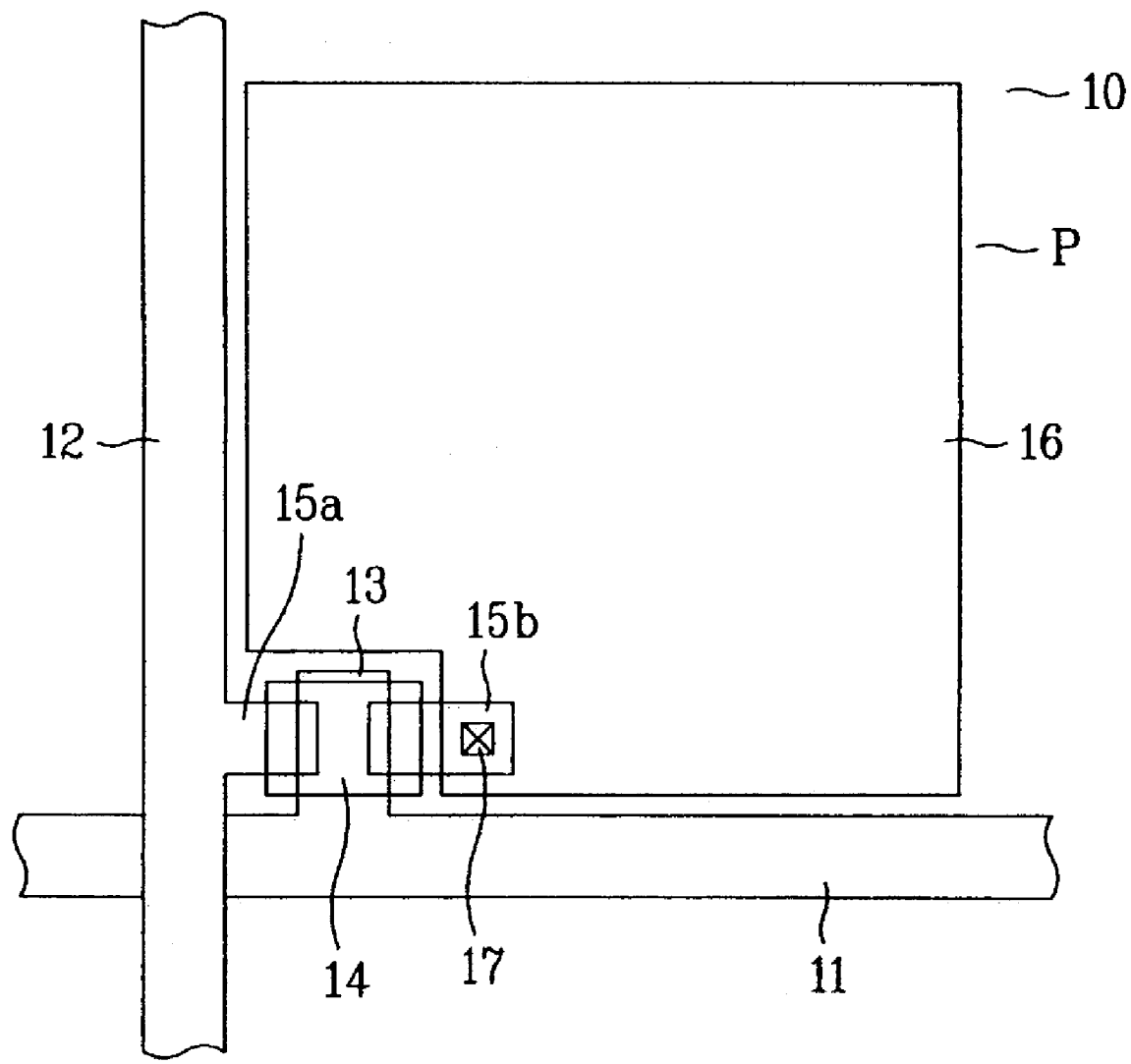
FIG. 1 illustrates a plan view illustrating a related art LCD device.
Figure 2A:
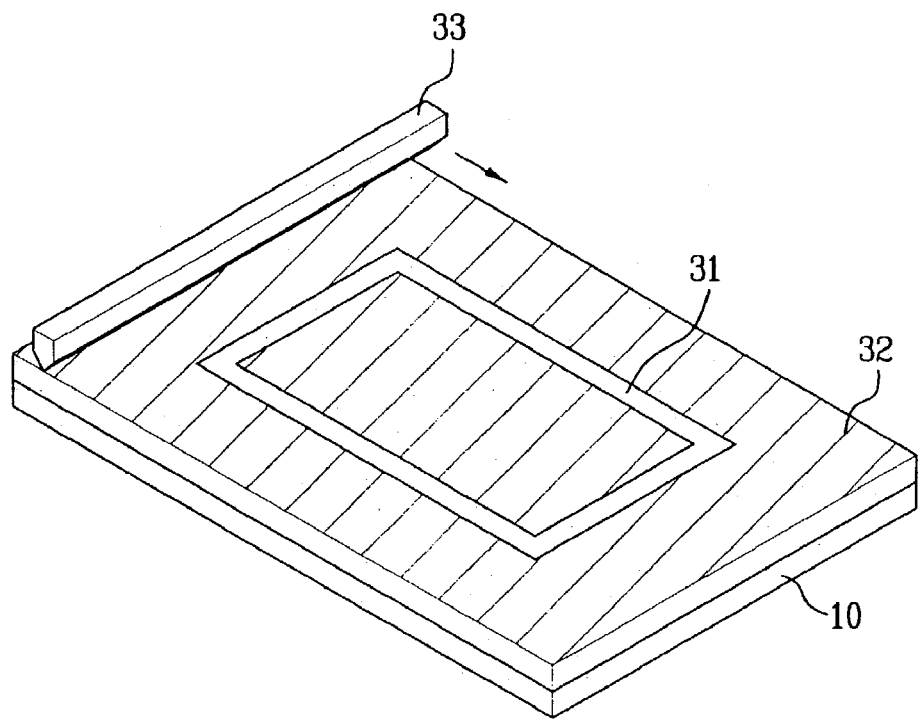
FIG. 2A illustrates a method of forming a seal pattern according to a screen printing method.
Figure 2B:
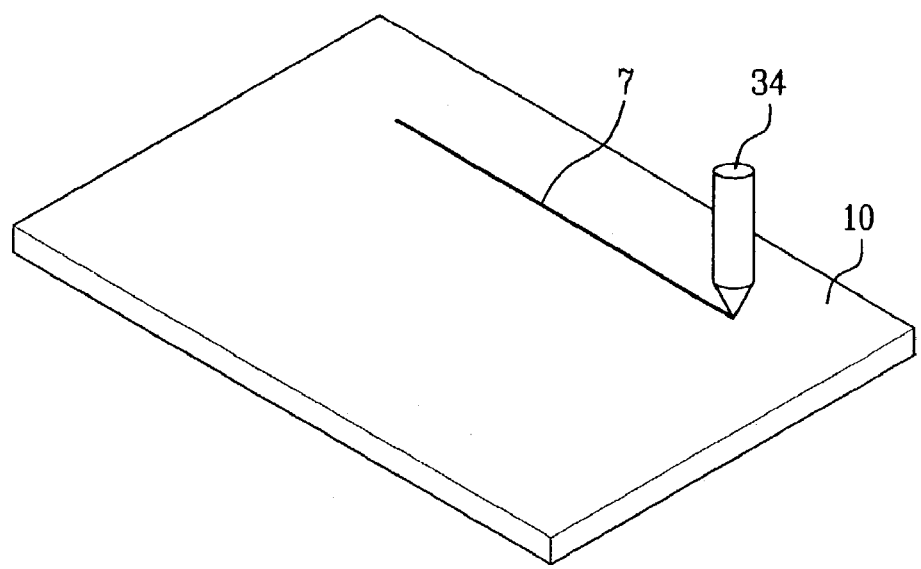
FIG. 2B illustrates a method of forming a seal pattern according to a dispensing method.
Figure 3A:
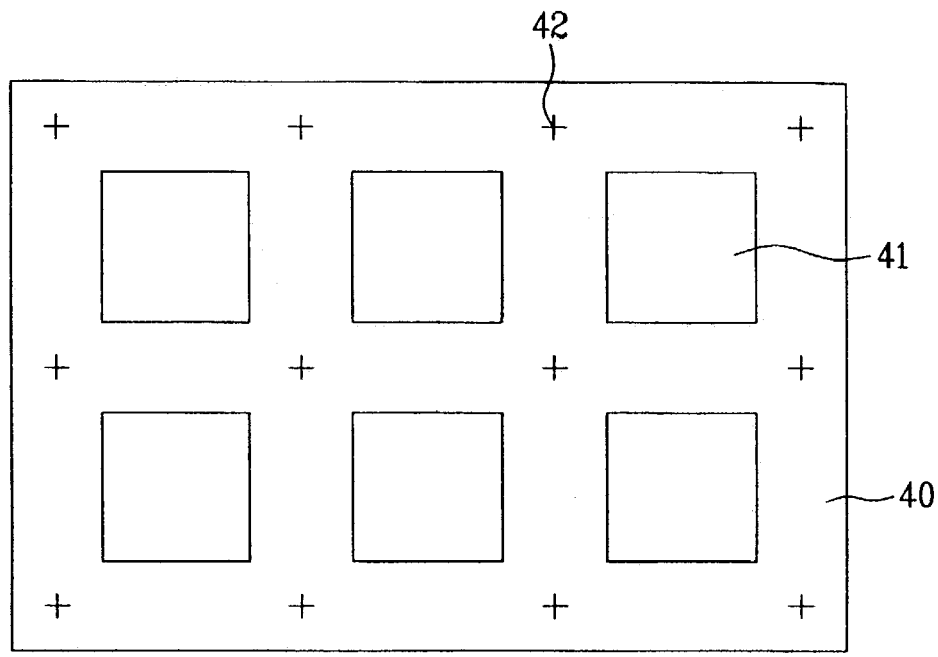
FIGS. 3A to 3E illustrate a method of forming a seal pattern for an LCD device in accordance with a first aspect of the present invention.

Referring to FIG. 3A, a plurality of LCD panels 41 may be arranged within a base substrate 40 at a fixed interval wherein a plurality of alignment marks 42 may be formed on the base substrate 40. In one aspect of the present invention, at least two alignment marks 42 may be formed at corners of each LCD panel 41. In another aspect of the present invention, four alignment marks 42 may be formed at corners of each LCD panel 41. According to the principles of the present invention, the alignment marks 42 may be formed in substantially any shape (e.g., +-shape, X-shape, rectangular shape, circular shape, etc.).

In one aspect of the present invention, the base substrate 40 may be prepared as a TFT array substrate supporting a plurality of gate lines and a plurality of data lines crossing the gate lines, wherein pixel regions are defined by the crossings of the gate and data lines. Thin film transistors may be formed at crossings of the gate and data lines, wherein each thin film transistor may, for example, include a gate electrode, a gate insulating layer, a semiconductor layer, an ohmic contact layer, source and drain electrodes, and a passivation layer. Pixel electrodes may be formed within respective ones of the pixel regions, connected to respective ones of the thin film transistors, and be arranged in a matrix pattern. In one aspect of the present invention, an alignment layer may be formed on the pixel electrodes to impart an initial alignment direction to molecules within subsequently dispensed liquid crystal material. Accordingly, the alignment layer may be formed of a polyamide or polyimide group compound material, polyvinylalcohol (PVA), polyamic acid, and the like. In another aspect of the present invention, the alignment direction of the alignment layer may provided via a rubbing process. In one aspect of the present invention, the alignment layer may be formed of any material having a photoreactive group including, for example, polyvinylcinnamate (PVCN), polysiloxanecinnamate (PSCN), cellulosecinnamate (CelCN), and the like. In another aspect of the present invention, the alignment direction of the alignment layer may provided via a light exposure process.

In another aspect of the present invention, the base substrate 40 may be prepared as a color filter substrate supporting a black matrix layer, an R/G/B color filter layer, and a common electrode. The black matrix layer may substantially prevent light from leaking to the gate lines, the data lines and the TFTs. The R/G/B color filter layer may be formed on the black matrix layer and the common electrode may be formed on the color filter layer. In one aspect of the present invention, an overcoat layer may be formed between the color filter layer and the common electrode. In another aspect of the present invention, the aforementioned alignment layer may also be formed on the common electrode.

In still another aspect of the present invention, silver (Ag) paste may be formed at the periphery of the base substrate 40 prepared as the TFT array substrate to facilitate the application of a voltage to the common electrode of a bonded second substrate 30. In one aspect of the present invention, the first and second substrates 20 and 30, respectively, may form an In-Plane Switching (IPS) mode LCD device. Therefore, both the common electrode and the pixel electrodes may be formed on the base substrate 40 to induce an in-plane electric field and formation of the silver (Ag) paste may not be necessary.

Figure 3B:
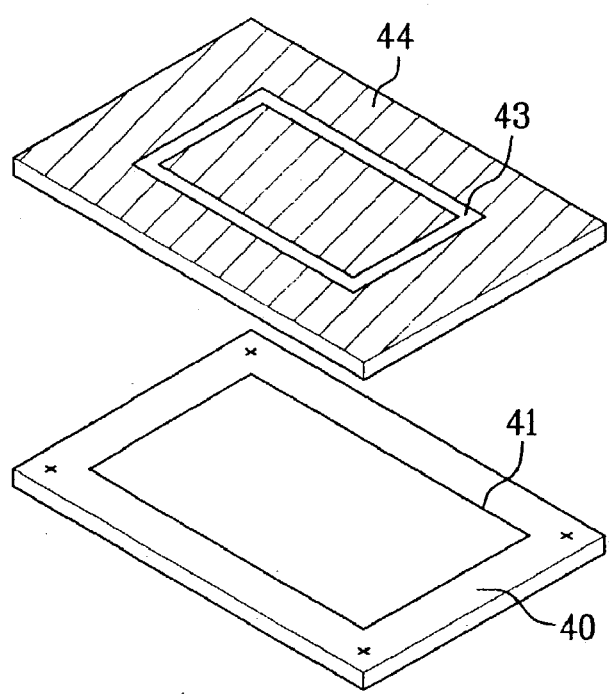
Figure 3C:
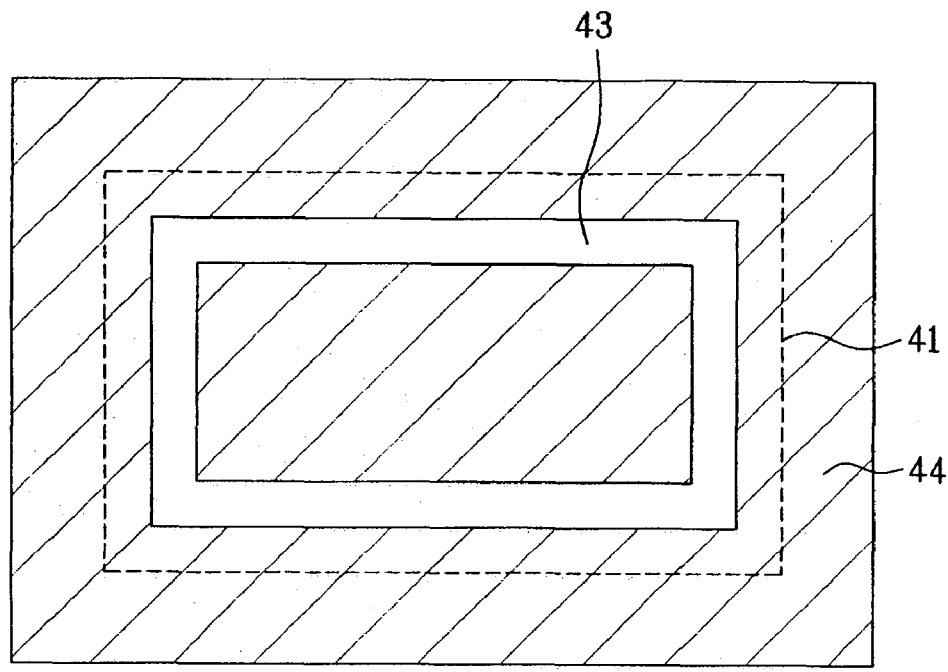

Referring to FIG. 3B, a division screen mask 44 (shown in greater detail in FIG. 3C) having an opening 43 may be arranged on the base substrate 40. In one aspect of the present invention, the alignment mark 42 may be used to arrange the division screen mask 44 over the base substrate 40 in a predetermined manner to align the opening 43 with at least one LCD panel 41.

Figure 3D:
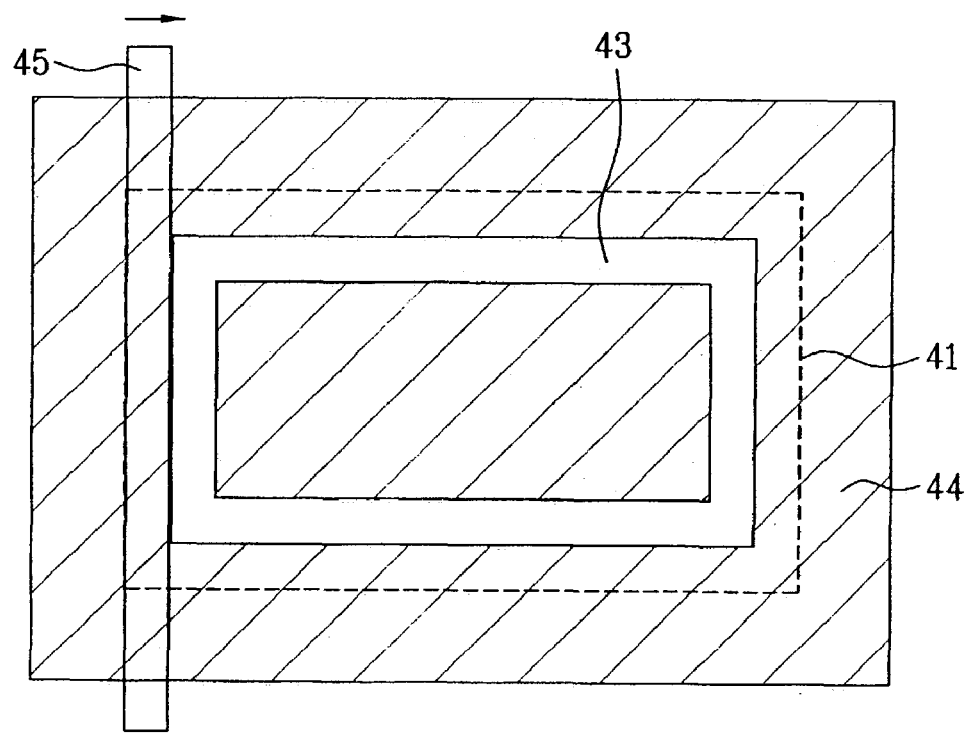
Figure 3E:
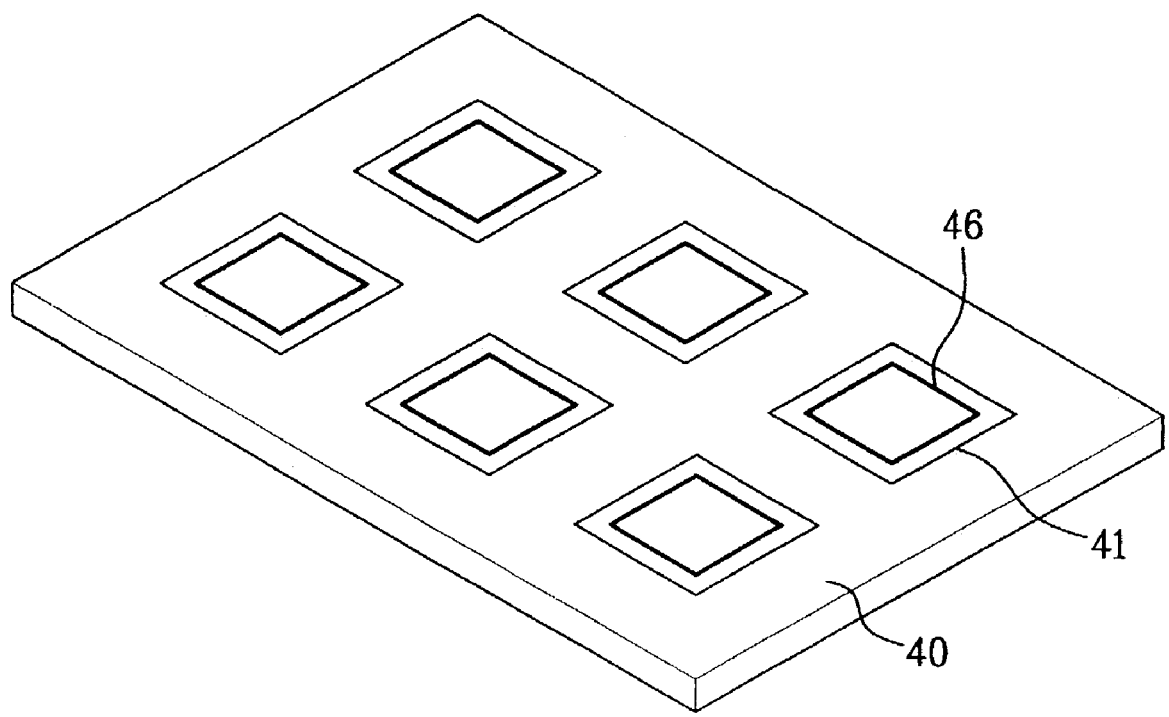

Referring to FIG. 3D, sealant material may be disposed onto a predetermined portion of the division screen mask 44, and a squeegee 45 may be used to roll the disposed sealant material over the screen mask 44 along the arrow direction and into the opening 43 to print a seal pattern 46 on the LCD panel 41, as shown in FIG. 3E.

In accordance with a first aspect of the present invention, six LCD panels 41 having substantially the same size may be formed on the same base substrate 40. Accordingly, the aforementioned process of disposing sealant material onto a properly aligned division screen mask 44 may be repetitively performed to sequentially print multiple seal patterns 46 onto the plurality of LCD panels 41.

Although not shown in the drawings, after printing the seal patterns 46, the base substrate 40 may be bonded to another substrate. Subsequently, bonded substrates may be irradiated with UV light to hardening the seal patterns 46.

Figure 4:
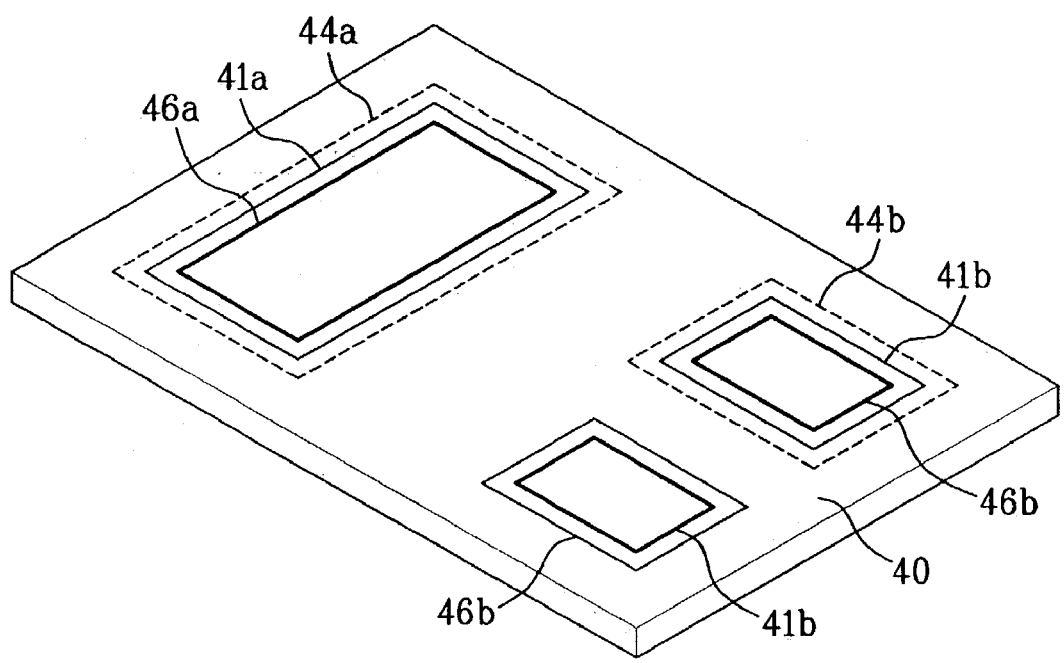
FIG. 4 illustrates a method of forming a seal pattern for an LCD device in accordance with a second aspect of the present invention.

FIG. 4 illustrates a method of forming a seal pattern for an LCD device in accordance with a second aspect of the present invention.

Referring to FIG. 4, a first LCD panel 41a having a first size and at least one second LCD panel 41b having a second size, different from the first size, may be arranged within the same base substrate 40. Accordingly, first and second screen masks 44a and 44b, respectively, having sizes corresponding to the first and second sizes, respectively, may be provided to form the seal patterns of the first and second LCD panels 41a and 41b, respectively.

Accordingly, the first screen mask 44a may be arranged over the region of the base substrate 40 corresponding to the first LCD panel 41a, sealant material may be disposed over a predetermined portion of the first screen mask 44a, and a squeegee may be used to roll the disposed sealant material over the first screen mask 44a along one direction and into an opening formed therein to print a first seal pattern 46a on the first LCD panel 41a. Further, the second screen mask 44b may be provided as a division screen mask and arranged over the region of the base substrate 40 corresponding to a second LCD panel 41b, sealant material may be disposed over a predetermined portion of the second division screen mask, and a squeegee may be used to roll the disposed sealant material over the second division screen mask 44b along one direction and into an opening formed therein to print a second seal pattern 46b on the second LCD panel 41b.

In accordance with the principles of the present invention, the at least one second LCD panel 41b may include more than one second LCD panel 41b formed within the base substrate 40. Accordingly the aforementioned process of disposing sealant material onto a properly aligned second screen mask 44b may be repetitively performed to sequentially print multiple second seal patterns 46b onto corresponding ones of the second LCD panels 41b.

Figure 5:
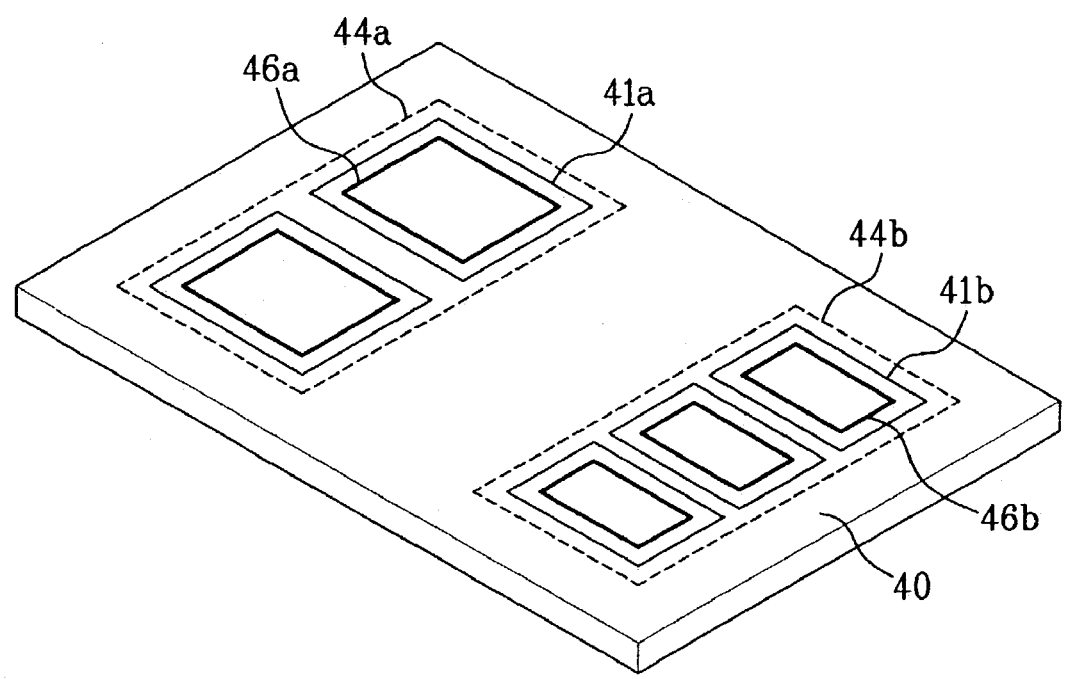
FIG. 5 illustrates a method of forming a seal pattern for an LCD device in accordance with a third aspect of the present invention.

FIG. 5 illustrates a method of forming a seal pattern for an LCD device in accordance with a third aspect of the present invention.

Referring to FIG. 5, a plurality of first LCD panels 41a having a first size and at least one second LCD panel 41b having a second size, different from the first size, may be formed within the same base substrate 40. In one aspect of the present invention, the first and second LCD panels 41a and 41b may be repetitively formed within the same base substrate 40. Accordingly, first and second screen masks 44a and 44b, respectively, having sizes corresponding to the first and second sizes of the plurality of first and second LCD panels 41a and 41b, respectively, may be provided to form the seal patterns of the plurality of first and second LCD panels 41a and 41b, respectively.

Accordingly, the first screen mask 44a may be arranged over the region of the base substrate 40 corresponding to the plurality of the first LCD panels 41a, sealant material may be disposed over a predetermined portion of the first screen mask 44a, and a squeegee may be used to roll the disposed sealant material over the first screen mask 44a and into openings formed therein to substantially simultaneously print a plurality of first seal patterns 46a onto corresponding ones of the plurality of first LCD panels 41a. Further, the second screen mask 44b may be arranged over the region of the base substrate 40 corresponding to the plurality of the second LCD panels 41b, sealant material may be disposed over a predetermined portion of the second screen mask 44b, and a squeegee may be used to roll the disposed sealant material over the second screen mask 44b and into openings formed therein to substantially simultaneously print a plurality of second seal patterns 46b onto corresponding ones of the plurality of second LCD panels 41b.

Figure 6A:
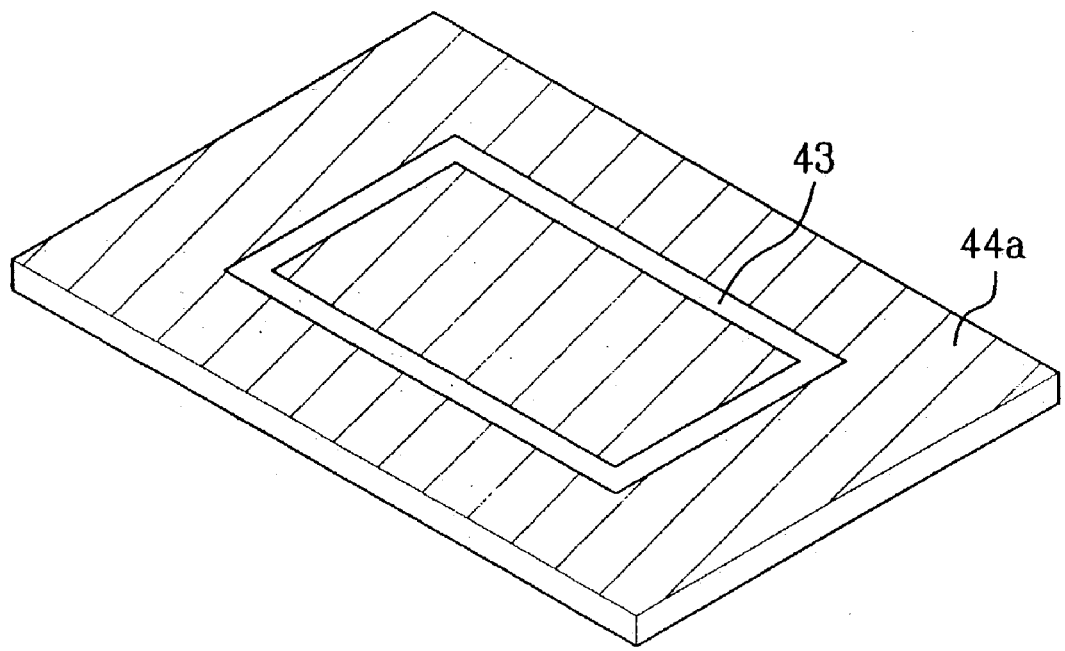
FIG. 6A illustrates a first screen mask used in the formation of the first LCD panel shown in FIG. 4.
Figure 6B:
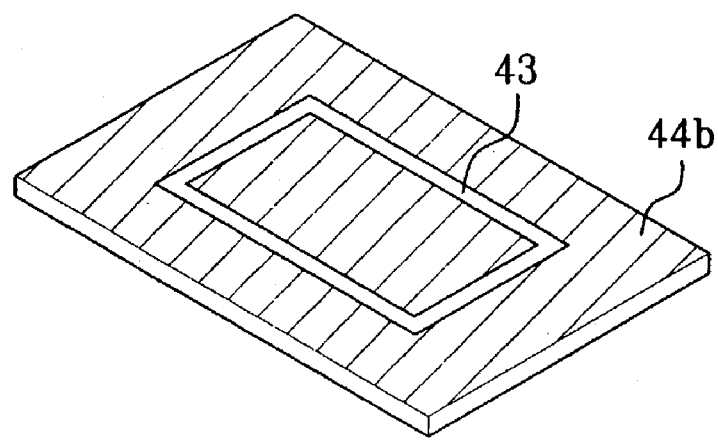
FIG. 6B illustrates a second screen mask used in the formation of the second LCD panel shown in FIG. 4.

FIG. 6A illustrates a first screen mask used in the formation of the first LCD panel shown in FIG. 4 while FIG. 6B illustrates a second screen mask used in the formation of the second LCD panel shown in FIG. 4.

Referring to FIGS. 6A and 6B, the sizes of the first and second screen masks 44a and 44b, respectively, substantially correspond to the first and second sizes of the first and second LCD panels, respectively. In one aspect of the present invention, each of the first and second screen masks 44a and 44b may include an opening 43, wherein the sizes of the opening 43 within the first and second screen masks 44a and 44b correspond substantially to the size of the first and second seal patterns 46a and 46b, respectively.

Figure 7A:
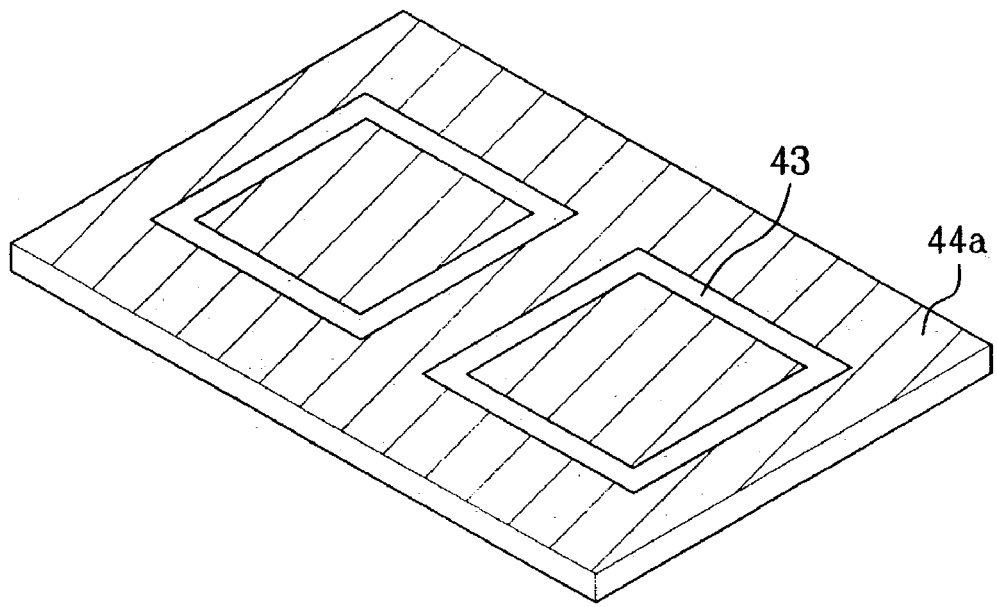
FIG. 7A illustrates a first screen mask used in the formation of the plurality of first LCD panels shown in FIG. 5.
Figure 7B:
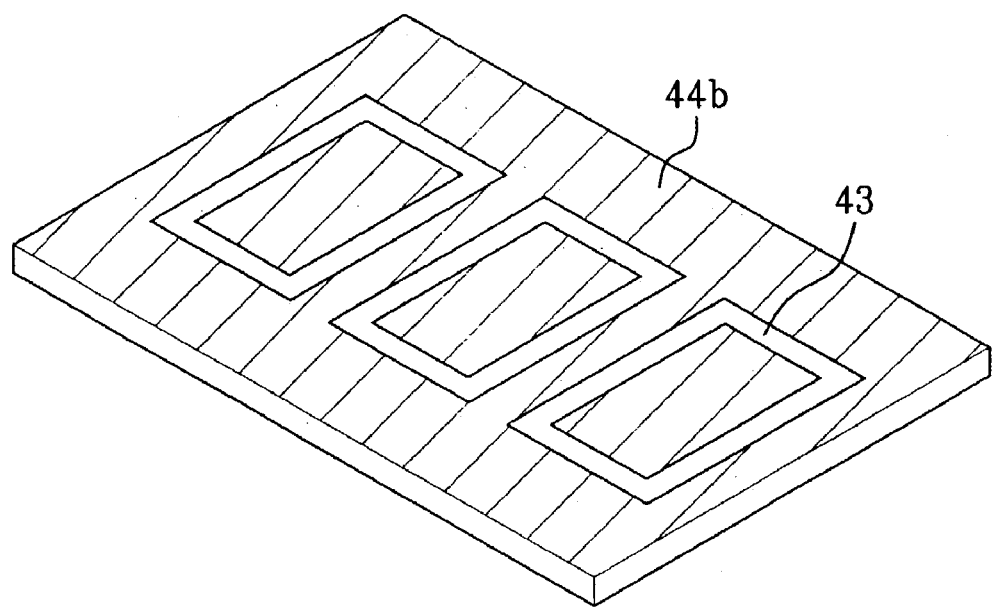
FIG. 7B illustrates a second screen mask used in the formation of the plurality of second LCD panels shown in FIG. 5.

FIG. 7A illustrates a first screen mask used in the formation of the plurality of first LCD panels shown in FIG. 5 while FIG. 7B illustrates a second screen mask used in the formation of the plurality of second LCD panels shown in FIG. 5.

Referring to FIGS. 7A and 7B, the first screen mask 44a may include a plurality of openings 43 (e.g., two) arranged to substantially correspond to the plurality of first LCD panels 41a (e.g., two) disposed within the base substrate 40. Further, the second screen mask 44b may include a plurality of openings 43 (e.g., three) arranged to substantially correspond to the plurality of second LCD panels 41b (e.g., three) disposed within the base substrate 40.

FIGS. 8A to 8D illustrate a method of forming an LCD device according to a dispensing method of the present invention.

Figure 8A:
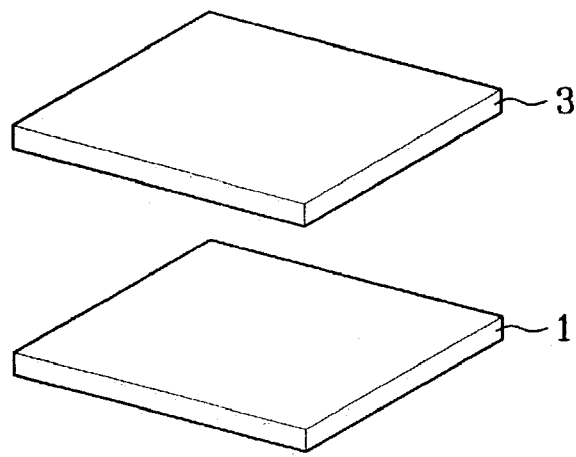
FIGS. 8A to 8D illustrate a method of forming an LCD device according to a dispensing method of the present invention.

Referring to FIG. 8A, lower and upper substrates 1 and 3 may be prepared. In one aspect of the present invention, the lower substrate 1 may be prepared as a TFT array substrate supporting a plurality of gate lines and a plurality of data lines crossing the gate lines, wherein pixel regions are defined by the crossings of the gate and data lines. Thin film transistors may be formed at crossings of the gate and data lines and pixel electrodes may be formed within respective ones of the pixel regions, connected to respective ones of the thin film transistors, and arranged in a matrix pattern.

In another aspect of the present invention, the upper substrate 3 may be prepared as a color filter substrate supporting a black matrix layer, an R/G/B color filter layer, and a common electrode. The black matrix layer may substantially prevent light from leaking to the gate lines, the data lines and the TFTs. The R/G/B color filter layer may be formed on the black matrix layer and the common electrode may be formed on the color filter layer.

In yet another aspect of the present invention, an alignment layer may be formed on at least one of the lower and upper substrates 1 and 3 to impart an initial alignment direction to molecules within subsequently dispensed liquid crystal material.

Figure 8B:
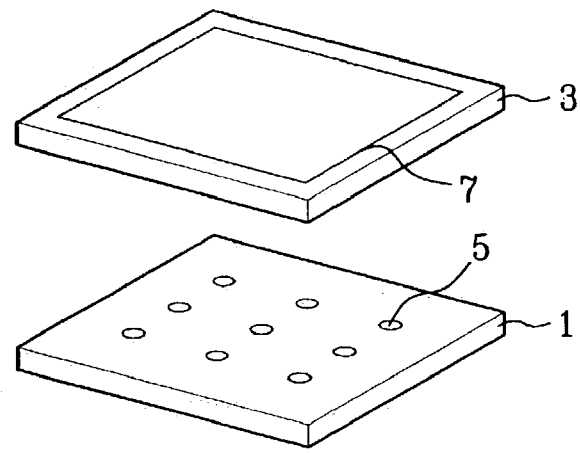

Referring to FIG. 8B, a seal pattern 7 may be formed on the upper substrate 3 according to a screen printing method incorporating a division screen mask. A layer of liquid crystal material may be formed on the lower substrate 1 according to a selective dispensing method, wherein liquid crystal material 5 is selectively dispensed directly onto a substrate. In one aspect of the present invention, the seal pattern 7 and the layer of liquid crystal material 5 may be formed on the same substrate (e.g., the lower or upper substrate 1 or 3).

Figure 8C:
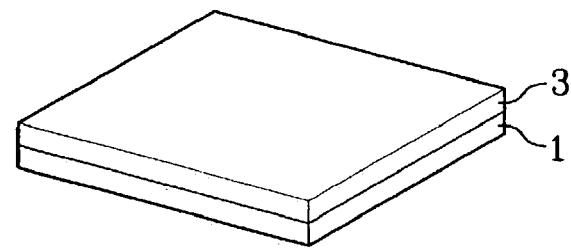

Referring to FIG. 8C, the lower and upper substrates 1 and 3 may be bonded to each other. As mentioned above, the layer of liquid crystal material may be provided according to a selective dispensing method. Accordingly, the seal pattern 7 may be provided as a closed shape and the lower and upper substrates 1 and 3 may be bonded to each other after selectively dispensing the liquid crystal material 5. Further, in accordance with the principles of the present invention, the seal pattern 7 may be formed of a sealant material that hardens upon exposure to light (e.g., UV light).

In another aspect of the present invention, however, the layer of liquid crystal material may be provided between the lower and upper substrate 1 and 3 according to a vacuum injection method. Accordingly, the seal pattern 7 may be provided with a liquid crystal injection inlet and the lower and upper substrates 1 and 3 may be bonded to each other followed by vacuum injection of liquid crystal material between the lower and upper substrates 1 and 3.

Figure 8D:
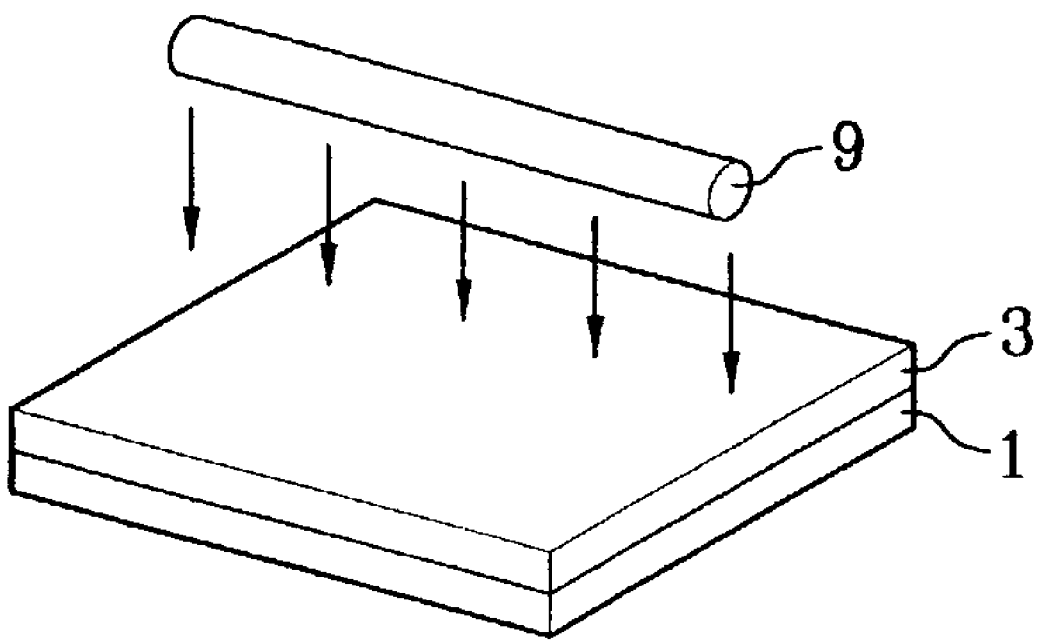

Referring to FIG. 8D, the seal pattern 7 may be hardened by irradiating the seal pattern 7 with UV light via UV irradiation unit 9. In one aspect of the present invention, the seal pattern may be formed of a material that hardens upon exposure to light (e.g., UV light) and heat. Accordingly, a heat treatment may be performed on the seal pattern 7 by heating a UV irradiated seal pattern 7 to a temperature of about 120° for about one hour.

The method of forming the seal pattern in accordance with the principles of the present invention is advantageous because the seal pattern may be printed onto regions of a base substrate corresponding to LCD panels by applying a division screen mask to a multi-printing method. Accordingly, a tact time may be decreased and the efficiency with which LCD panels are formed within a base substrate (e.g., a large-sized substrate) may be increased. Further, the principles of the present invention may be applied to form different sized LCD panels within the same base substrate, thereby improving the efficiency with which the base substrate is used.

It will be apparent to those skilled in the art that various modifications and variations can be made in the present invention without departing from the spirit or scope of the invention. For example, while it has been shown that the a plurality of second LCD panels may be formed within the same base substrate as the first LCD panel, the principles of the present invention may be extended to provide a single second LCD panel within the same base substrate as the first LCD panel. Further, use of the first mask shown in FIG. 6A may be repeated a predetermined number of times, as use of the second mask shown in FIG. 6B was repeated (see, for example, FIG. 4). Still further, while it has been shown in FIG. 5 that the first and second masks illustrated in FIGS. 7A and 7B were used once, it will be appreciated that use of the masks illustrated in FIGS. 7A and 7B may be repeated a predetermined number of times even with respect to LCD panels within the same base substrate. Still further, while it has been shown that the first and second masks illustrated in FIGS. 6A–6B and 7A–7B were used together, it will readily be appreciated that masks illustrated in any of FIGS. 6A–7B may be used together, and any number of times, with respect to LCD panels within the same base substrate. Thus, it is intended that the present invention covers the modifications and variations of this invention provided they come within the scope of the appended claims and their equivalents.

What is claimed is:

1. A method of forming a seal pattern for a liquid crystal display device, comprising:
preparing a base substrate including a plurality of liquid crystal display panels;
arranging a mask over a first plurality of liquid crystal display panels, wherein a plurality of openings are provided within the mask;
forming a plurality of seal patterns on the first plurality of liquid crystal display panels in correspondence with the plurality of openings within the mask;
arranging the mask over a second plurality of liquid crystal display panels; and
forming a plurality of seal patterns on the second plurality of liquid crystal display panels in correspondence with the plurality of openings within the mask.

2. The method of claim 1, wherein the plurality of liquid crystal display panels are the same size.

3. The method of claim 1, wherein the base substrate is a TFT array substrate.

4. The method of claim 1, wherein the base substrate is a color filter substrate.

5. The method of claim 1, wherein forming the seal pattern further includes:
disposing sealant material over a predetermined portion of the mask; and
rolling the disposed sealant material over the mask and into the openings.

6. The method of claim 1, further comprising forming alignment marks on the base substrate.

7. The method of claim 6, further comprising forming alignment marks at a periphery of the plurality of liquid crystal display panels.

8. The method of claim 6, further comprising forming at least two alignment marks at corners of each of the plurality of liquid crystal display panels.

9. The method of claim 6, further comprising forming four alignment marks at corners of each of the plurality of liquid crystal display panels.

10. The method of claim 6, further comprising forming alignment marks at corners of the plurality of liquid crystal display panels.

11. The method of claim 6, wherein at least one of the alignment marks is provided as a X-shape.

12. The method of claim 6, wherein at least one of the alignment marks is provided as a +-shape.

13. The method of claim 6, wherein at least one of the alignment marks is provided as a rectangular shape.

14. The method of claim 6, wherein at least one of the alignment marks is provided as a circular shape.

15. A method of forming a seal pattern for a liquid crystal display device, comprising:
preparing a base substrate including a first liquid crystal display panel having a first size and a plurality of second liquid crystal display panels each having a size different from the first size;
arranging a first mask over the first liquid crystal display panel, wherein an opening is provided within the first mask;
forming a first seal pattern on the first liquid crystal display panel in correspondence with the opening within the first mask;
arranging a second mask over a first group of the plurality of second liquid crystal display panels, wherein a plurality of openings are provided within the second mask; and
forming a first plurality of second seal patterns on the first group of the plurality of second liquid crystal display panels in correspondence with the plurality of openings within the second mask.

16. The method of claim 15, wherein the first size is greater than the size of each of the plurality of second liquid crystal display panels.

17. The method of claim 15, wherein each of the plurality of second liquid crystal display panels has a second size.

18. The method of claim 15, wherein forming a plurality of second seal patterns includes:
arranging the second mask over a second group of the plurality of second liquid crystal display panels; and
forming a second plurality of second seal patterns on the second group of the plurality of second liquid crystal display panels in correspondence with the plurality of openings in the second mask.

19. The method of claim 15, wherein the base substrate is a TFT array substrate.

20. The method of claim 15, wherein the base substrate is a color filter substrate.

21. The method of claim 15, wherein forming the first seal pattern further includes:
disposing sealant material over a predetermined portion of the first mask; and
rolling the disposed sealant material over the first mask and into the opening within the first mask.

22. The method of claim 15, wherein forming the plurality of second seal patterns further includes:
disposing sealant material over a predetermined portion of the second mask; and
rolling the disposed sealant material over the second mask and into the openings within the second mask.

23. The method of claim 15, further comprising forming alignment marks on the base substrate.

24. The method of claim 23, further comprising forming alignment marks at a periphery of the first liquid crystal display panel.

25. The method of claim 23, further comprising forming alignment marks at a periphery of the at least one liquid crystal display panel.

26. The method of claim 23, further comprising forming at least two alignment marks at corners of the first liquid crystal display panel.

27. The method of claim 23, further comprising forming at least two alignment marks at corners of the at least one second liquid crystal display panel.

28. The method of claim 23, further comprising forming four alignment marks at corners of the first liquid crystal display panel.

29. The method of claim 23, further comprising forming four alignment marks at corners of the at least one second liquid crystal display panel.

30. The method of claim 23, further comprising forming alignment marks at corners of the first liquid crystal display panel.

31. The method of claim 23, further comprising forming alignment marks at corners of the at least one second liquid crystal display panel.

32. The method of claim 23, wherein at least one of the alignment marks is provided as a X-shape.

33. The method of claim 23, wherein at least one of the alignment marks is provided as a +-shape.

34. The method of claim 23, wherein at least one of the alignment marks is provided as a rectangular shape.

35. The method of claim 23, wherein at least one of the alignment marks is provided as a circular shape.

36. A method of forming a seal pattern for a liquid crystal display device, comprising:
- preparing a base substrate including first and second regions including a plurality of first liquid crystal display panels having a first size and a plurality of second liquid crystal display panels having a second size, respectively, wherein the second size is different from the first size;
- arranging a first mask over the first region of the base substrate, wherein openings are provided within the first mask;
- forming a plurality of first seal patterns on the plurality of first liquid crystal display panels within the first region in correspondence with the openings within the first mask;
- arranging a second mask over the second region of the base substrate, wherein openings are provided within the second mask; and
- forming a plurality of second seal patterns on the plurality of second liquid crystal display panels within the second region in correspondence with the openings within the second mask.

37. The method of claim 36, wherein the first size is greater than the second size.

38. The method of claim 36, wherein the base substrate is a TFT array substrate.

39. The method of claim 36, wherein the base substrate is a color filter substrate.

40. The method of claim 36, wherein forming the plurality of first seal patterns further includes:
- disposing sealant material over a predetermined portion of the first mask; and
- rolling the disposed sealant material over the first mask and into the openings within the first mask.

41. The method of claim 36, wherein forming the plurality of second seal patterns further includes:
- disposing sealant material over a predetermined portion of the second mask; and
- rolling the disposed sealant material over the second mask and into the openings within the second mask.

42. A method of fabricating liquid crystal display panels, comprising:
- preparing a base substrate including at least one first liquid crystal display panel having a first size and at least one second liquid crystal display panel having a second size, different from the first size, wherein the number of first liquid crystal display panels included within the base substrate is different than the number of second liquid crystal display panels included within the base substrate;
- arranging a first mask over at least one first liquid crystal display panel, wherein at least one opening is provided within the first mask;
- forming at least one first seal pattern on the at least one first liquid crystal display panel via the first mask;
- arranging a second mask over at least one second liquid crystal display panel, wherein at least one opening is provided within the second mask, wherein the number of openings provided within the second mask is different than the number of openings provided within the first mask; and
- forming at least one second seal pattern on the at least one second liquid crystal display panel via the second mask.

43. The method of claim 42, wherein the at least one first liquid crystal display panel includes a single first liquid crystal display panel.

44. The method of claim 42, wherein the at least one first liquid crystal display panel includes a plurality of first liquid crystal display panels.

45. The method of claim 42, wherein the at least one second liquid crystal display panel includes a single second liquid crystal display panel.

46. The method of claim 42, wherein the at least one second liquid crystal display panel includes a plurality of second liquid crystal display panels.

47. The method of claim 42, wherein the first mask includes a single opening.

48. The method of claim 42, wherein the first mask includes a plurality of openings.

49. The method of claim 42, wherein the second mask includes a single opening.

50. The method of claim 42, wherein the second mask includes a plurality of openings.

51. The method of claim 42, wherein the at least one first seal pattern includes a single first seal pattern.

52. The method of claim 42, wherein the at least one first seal pattern includes a plurality of first seal patterns.

53. The method of claim 52, wherein the forming the plurality of first seal patterns includes sequentially forming individual ones within the plurality of first seal patterns.

54. The method of claim 52, wherein the forming the plurality of first seal patterns includes substantially simultaneously forming the plurality of first seal patterns.

55. The method of claim 42, wherein the at least one second seal pattern includes a single second seal pattern.

56. The method of claim 42, wherein the at least one second seal pattern includes a plurality of second seal patterns.

57. The method of claim 56, wherein the forming the plurality of second seal patterns includes sequentially forming individual ones within the plurality of second seal patterns.

58. The method of claim 56, wherein the forming the plurality of second seal patterns includes substantially simultaneously forming the plurality of second seal patterns.

* * * * *